(12) United States Patent
Van Buskirk et al.

(10) Patent No.: US 12,083,477 B2
(45) Date of Patent: Sep. 10, 2024

(54) PHOTOCATALYTIC FLUID PURIFICATION SYSTEMS

(71) Applicants: Peter C. Van Buskirk, Brookfield, CT (US); Jeffrey F. Roeder, Newtown, CT (US); Melissa A. Petruska, Newtown, CT (US)

(72) Inventors: Peter C. Van Buskirk, Brookfield, CT (US); Jeffrey F. Roeder, Newtown, CT (US); Melissa A. Petruska, Newtown, CT (US)

(73) Assignee: Sonata Scientific LLC, Bethel, CT (US)

( * ) Notice: Subject to any disclaimer, the term of this patent is extended or adjusted under 35 U.S.C. 154(b) by 1230 days.

(21) Appl. No.: 16/147,536

(22) Filed: Sep. 28, 2018

(65) Prior Publication Data

US 2019/0091627 A1   Mar. 28, 2019

Related U.S. Application Data

(60) Provisional application No. 62/595,261, filed on Dec. 6, 2017, provisional application No. 62/564,408, filed on Sep. 28, 2017.

(51) Int. Cl.
*B01D 53/00* (2006.01)
*A01G 7/04* (2006.01)
(Continued)

(52) U.S. Cl.
CPC ......... *B01D 53/8668* (2013.01); *A01G 7/045* (2013.01); *B01D 53/8696* (2013.01); *B01J 21/063* (2013.01); *B01J 23/50* (2013.01); *B01J 35/004* (2013.01); *B01J 35/04* (2013.01); *G01D 21/02* (2013.01); *B01D 2255/20707* (2013.01); *B01D 2255/70* (2013.01); *B01D 2255/802* (2013.01); *B01D 2257/7022* (2013.01)

(58) Field of Classification Search
None
See application file for complete search history.

(56) References Cited

U.S. PATENT DOCUMENTS

2006/0006820 A1* 1/2006 Roseman ............... A01G 7/045
                                                       315/312
2006/0127288 A1* 6/2006 Hay .......................... A61L 9/16
                                                       422/186.3

(Continued)

FOREIGN PATENT DOCUMENTS

CN      102213966 A  * 10/2011  ............. A23B 7/015
WO   WO-2015005661 A  *  1/2015  ............. A23B 7/015
WO   WO-2016048009 A1 *  3/2016  ........... B01J 23/6527

OTHER PUBLICATIONS

Fresh Veggies From Space (Year: 2001).*

(Continued)

*Primary Examiner* — Stefanie J Cohen
(74) *Attorney, Agent, or Firm* — Gregory Stauf

(57) ABSTRACT

The Invention describes LED illuminated photocatalytic fluid purification systems, especially for use for ethylene mitigation and control in agricultural, horticultural and floricultural growth, storage and transport modules. Aspects of the invention include systems integration with grow lights, ethylene and plant stress sensors, and communication with external control and data sources.

3 Claims, 15 Drawing Sheets

(51) Int. Cl.
  *B01D 53/86* (2006.01)
  *B01J 21/06* (2006.01)
  *B01J 23/50* (2006.01)
  *B01J 35/00* (2006.01)
  *B01J 35/04* (2006.01)
  *G01D 21/02* (2006.01)

(56) References Cited

U.S. PATENT DOCUMENTS

| | | | | |
|---|---|---|---|---|
| 2011/0245074 | A1* | 10/2011 | Smith | C01B 13/0214 |
| | | | | 502/305 |
| 2013/0079577 | A1* | 3/2013 | Ingram | C01G 23/047 |
| | | | | 977/773 |
| 2015/0376441 | A1* | 12/2015 | Guldin | C09D 5/006 |
| | | | | 427/164 |
| 2017/0266650 | A1* | 9/2017 | Seo | B01J 35/1061 |

OTHER PUBLICATIONS

Hartwig et al., A Highly Sensitive IR-Optical Sensor for Ethylene Monitoring, Smart Sensors, Actuators and Mems II (Year: 2005).*
CN-102213966-A—English translation (Year: 2011).*
WO-2015005661-A1—English translation (Year: 2015).*

* cited by examiner

PHOTOCATALYTIC FLUID PURIFICATION SYSTEMS

CROSS REFERENCE TO RELATED APPLICATIONS

This application is a U.S. Utility application taking priority from U.S. Provisional application No. 62/564,408 "Photocatalytic Fluid Purification systems", filed Sep. 28, 2017, and from U.S. Provisional Patent Application No. 62/595,261 "Photocatalytic surface systems", filed Dec. 9, 2017, both herein incorporated by reference.

BACKGROUND OF THE INVENTION

References

U.S. Pat. No. 9,480,766 "Photocatalytic devices and systems". Anon (2013) Waste and Spoilage in the Food Chain. Rockefeller Foundation. https://assets.rockefellerfoundation.org/app/uploads/20130528220516/Waste-and-Spoilage-inthe-Food-Chain.pdf. Accessed 20 Jun. 2018.

Awazu K, et al., "A Plasmonic Photocatalyst Consisting of Silver Nanoparticles Embedded in Titanium Dioxide" *Journal of the American Chemical Society* 2008, 130, 1676.

CEPA (2014) Transport Refrigerators—Technology Assessment. California Environmental Protection Agency, Sacramento, Calif., Sep. 3, 2014, https://www.arb.ca.gov/msprog/tech/techreport/tru_07292015.pdf. Accessed 4 Oct. 2017. Dzakovich, M. P. et al., "Manipulating Sensory and Phytochemical Profiles of Greenhouse Tomatoes Using Environmentally Relevant Does of Ultraviolet Radiation" *Journal of Agricultural and Food Chemistry* 2016, 64, 6801.

Dunlop, P. S. M. et al., "Inactivation of clinically relevant pathogens by photocatalytic coatings" *Journal of Photochemistry and Photobiology A* 2010, 216, 303.

Hay, S. O. et al., "The Viability of Photocatalysis for Air Purification" *Molecules* 2015, 20, 1319.

Hussain, S. B. et al., "Photocatalytic Degradation of Ethylene Emitted by Fruits with TiO2 Nanoparticles" *Industrial & Chemical Engineering Research* 2011, 50, 2536.

Janssen, S. et al., "Ethylene Detection in Fruit Supply Chains" *Philosophical Transactions A* 2014, 372, 20130311.

Kartheuser, B. et al., "Photocatalysis: A Powerful Technology for Cold Storage Applications" *Journal of Advanced Oxidation Technology* 2007, 10, 107.

Keller, N. et al., "Ethylene Removal and Fresh Product Storage: A Challenge at the Frontiers of Chemistry. Toward an Approach by Photocatalytic Oxidation" *Chemical Reviews* 2013, 113, 5029.

Kubacka, A. et al., "Advanced Nanoarchitectures for Solar Photocatalytic Applications" *Chemical Reviews* 2012, 112, 1555.

Kubacka, A. et al., "Understanding the Antimicrobial Mechanism of TiO2-based Nanocomposite Films in a Pathogenic Bacterium" *Scientific Reports* 2014, 4, 4134.

Martinez-Romero, D. et al., "Tools to Maintain Postharvest Fruit and Vegetable Quality through the Inhibition of Ethylene Action: A Review" *Critical Reviews in Food Science and Nutrition* 2007, 47, 543.

Nakano, R. et al., "Broad Spectrum Microbiocidal Activity of Photocatalysis by $TiO_2$" *Catalysts* 2013, 3, 310.

Nelson, B. N. et al., U.S. Pat. No. 6,105,416. Washington, D.C.: US Patent and Trademark Office.

Obee, T. N. et al. "Effects of Moisture and Temperature on the Photooxidation of Ethylene on Titania" *Environmental Science and Technology* 1997, 31, 2034.

Rees, D. et al., "Ethylene and Microbial Hotspots in the Fresh Produce Supply Chain" WRAP Final Report, 2011, 40 pp.

Shekarriz, A. et al., (2007) U.S. Pat. No. 7,560,013. Washington, D.C.: US Patent and Trademark Office.

Shur, M. et al., (2013) U.S. Pat. No. 8,384,047. Washington, D.C.: US Patent and Trademark Office.

Toivonen, P. M. A. et al., 2014 Postharvest Care and the Treatment of Fruits and Vegetables. In Dixon, G. R. and Aldous, D. E. (eds) Horticulture: Plants for Peoples and Places, Volume 1, Production Horticulture, Springer, 465.

Wills, R. B. H. et al., "Reduction of Energy Usage in Postharvest Horticulture through Management of Ethylene" *Journal of the Science of Food and Agriculture* 2015, 95, 1379

The present invention relates to gaseous fluid purifying systems that incorporate novel photocatalytic materials. The plethora of chemical contaminants in our environment is a major concern, and their deleterious health effects are only partially understood but believed to be enormous. Commercially practical techniques for removal of these contaminants are therefore of great interest. Examples of contaminants include, but are by no means limited to formaldehydes, aromatic hydrocarbons, various nitrogen oxides, pesticides, specific bacteria, viruses, etc. Chemicals and their exposure hazards are ubiquitous in homes and many workplaces beyond the chemical industry. Despite regulations, workplace chemical exposures persist, with workers suffering the effects of this exposure. As an example, high, short-duration chemical exposure routinely occurs in nail and hair salons across the country, directly affecting workers. Other commercial and industrial activities experience similar complications, where general air quality may appear satisfactory, but certain locations within a facility pose higher levels of exposure. Residential air quality has also become a significant issue as homes have become tighter to improve their energy efficiency. Whether the customer is a commercial salon, a light industrial manufacturer, a heavy industry, or a residential homeowner, similar economic arguments prevail: weighing the capital cost of ventilation and providing conditioned make up air vs. point-of-use solutions to meet regulatory requirements or realize healthy environments.

Fruits and vegetables are a fundamental food resource, and prolonging their storage life is a critical challenge, especially during storage and shipping. Ethylene is a ubiquitous plant hormone that promotes ripening, but in large quantities (>100 ppb), can cause over-ripening and increased susceptibility to pathogens and senescence. For some species, much smaller amounts of ethylene are deleterious to post-harvest shelf life. Reduction of ethylene levels to 5 ppb can dramatically extend storage times, suggesting precise ethylene control as a major opportunity to reduce refrigeration and spoilage costs. While several ethylene mitigation schemes are known, they are inefficient, costly and involve toxic materials.

We are also faced with increasing threats from harmful microbes, including bacteria, viruses, spores and bacteria comprised biofilms. Healthcare Associated Infections (HAI) are a major problem that threatens life and increases costs of healthcare. The CDC estimates that in the U.S. there are 1.7 million hospital-associated infections annually, contributing to 99,000 deaths. One primary transmission mode for these infections involves contact with contaminated surfaces, where bacteria and viruses can reside for days or even weeks on touch surfaces near the patient. MRSA, *C. Difficile*, MDRA and *Staphylococcus* are particularly dangerous and stubborn contagions that may reside on surfaces close to a patient. Many types are difficult to attack with antibiotics, and antibiotic resistance is spreading to Gram-negative bacteria that can infect people outside the hospital.

Outside the healthcare world, there are a similar and increasing range of opportunistic mass-infections as evidenced by recent Norovirus outbreaks on cruise ships. These outbreaks may be spread by viruses, bacteria and spores that propagate both airborne and from surfaces to surface.

Titanium dioxide is the archetypal photocatalyst, due to its highly oxidizing properties when irradiated by UV light, physical robustness, insolubility in water, low cost, low toxicity and other attributes. Photocatalysis using titanium dioxide (titania, $TiO_2$) has received huge interest for purifying gases and fluids, in particular air and aqueous fluids, via oxidizing chemical reactions at a surface, via creation of electron-hole pairs.

A wide variety of titania-based materials, doping schemes, physical configurations have been proposed to enhance and utilize photocatalysis at $TiO_2$ surfaces, although so far there has not been widespread adoption of the technology for purification of air, fluids or surfaces. The inventors of the present invention believe that several technical and economic factors have limited the utility, effectiveness, commercial viability of photocatalytic air purification systems.

Photocatalysis is typically achieved by a low or medium pressure UV lamp, or in some cases a Xenon lamp, irradiating the front surface of a ceramic or powder based titania surface, i.e. from the direction of the medium that is targeted to be purified. UV LEDs have also been employed, although these devices typically have very short product lifetimes and are unreliable. Photocatalysis utilizing titanium dioxide is typically excited by illumination in the UV, e.g., UVC (200-280 nm), most typically using low pressure or medium pressure mercury lamps (which emit 254 nm light) which is hazardous to humans, and including disposal costs, more expensive than visible light based illumination sources (390 nm-700 nm) or sources in the 365-405 nm range. UV LEDs may also be used, but shorter wavelengths (<365 nm) have similar hazards. Further, UV LEDs with wavelengths shorter that 365 nm have low efficiencies and short lifetimes. Some recent systems use wavelengths up to 365 nm, but these wavelengths are still hazardous to humans.

The chemical activation at the surface of a photocatalytic surface originates with the formation of electron-hole pairs that arise from optical stimulation. Activation at the surface typically has a finite lifetime that is limited by illumination and recombination of electron-hole pairs. Mitigation of these effects has been investigated primarily via chemical modification of the titania particles, although there has been no consensus in technical approach for manufacturing practical photocatalyst materials and systems.

The photocatalytic materials of the present invention, such as those described above, and others that include zinc oxide and sodium tantalite, may be formed in a variety of configurations also identified in the present invention, thereby enabling a range of photocatalytic fluid purification systems and antimicrobial surfaces and devices. Photocatalytic purification may be used to remove organic and other chemical species from a fluid that may be either gaseous (e.g. air, air mixtures or other gasses) or liquid (e.g. water). Impurity species in such a fluid are brought into near proximity or adsorbed at the photocatalytic surface, and are subsequently chemically dissociated.

The subject invention may be embodied in the following examples that are by no means restrictive, but intended to illustrate the invention. It will be clear that the described invention is well adapted to achieve the purposes described above, as well as those inherent within. The citation of any publication is for its disclosure prior to the filing date and should not be construed as an admission that the present invention is not entitled to antedate such publication by virtue of prior invention. Numerous other changes may be made which will readily suggest themselves to those skilled in the art and which are encompassed both in the spirit of the disclosure above and the appended claims.

SUMMARY OF THE INVENTION

The present invention relates to novel photocatalytic materials, and to gaseous fluid purifying systems that incorporate those materials. It also relates to novel systems implementations that utilize the subject materials systems and relates to integration of these systems in plants logistics modules for transport, storage of plants and produce, and integration with horticultural and agricultural grow light systems for mitigation and control of plant hormones such as ethylene. It also relates to the use of sensors to control the subject photocatalytic systems. It also relates to remote or closed loop control of the subject photocatalytic systems, based on logic operations that may be based on integrated environment sensors and external inputs.

DETAILED DESCRIPTION OF THE INVENTION, AND PREFERRED EMBODIMENTS THEREOF

One aspect of the invention relates to fabrication methods to form nanoengineered thin layers or islands of TiO2 or modified TiO2 ceramics on mesoporous open-cell supports that have high transmission of illumination at the activating wavelengths for highly efficient use of the material. The porous support will also enhance VOC activity, promoting near complete or complete mineralization (i.e., decomposition) of target environmental contaminants. The $TiO_2$ ceramic materials will preferably have a high content of the anatase crystal phase to optimize photocatalytic surface chemistry and activity and a surface rich in hydroxyl groups. Other modified titanium dioxide compositions include those doped with rare earth oxides, (e.g. $TiO_2$—$CeO_2$ or any other lanthanide or combination thereof), with transition metals (e.g. Co, W, V, W, Zr, Cu, Fe Cr) or the aforementioned materials combined with metal nanoscale or microscale metal particles at the titania surface, e.g. Pt, Ag, Cu, Fe etc. All of these composite, doped and metal article containing titanium oxide based materials, including but not limited to the stoichiometric $TiO_2$ formulations, will be referred to as "titania" in the description and claims of this invention. These compounds and combinations of other photocatalytic compounds, formed on optically non-absorbing supports that have both mesopores (pores between 2 and 50 nm) and micropores (pores <2 nm), will be referred to as 'monolithic composite photocatalysts' For this purpose 'optically non-absorbing' denotes absorption less than approximately 2% for UV and visible wavelengths greater than 250 nm, and in preferred embodiments for UV and visible wavelengths greater than 350 nm. These nanoengineered thin layers or islands may also be particularly active when formed on high surface area or high porosity open-cell substrates, for example those which have B.E.T. surface area in the range of 50-900 $m^2/g$, mesopore size in the range of 2-15 nm, and with pore volume in the 0.2-1 ml/g range. Open-cell substrate compositions can include alumina, silica, and zeolites that exhibit transparency (>90% transmission as defined below) at the wavelengths of illumination.

Figure 1:
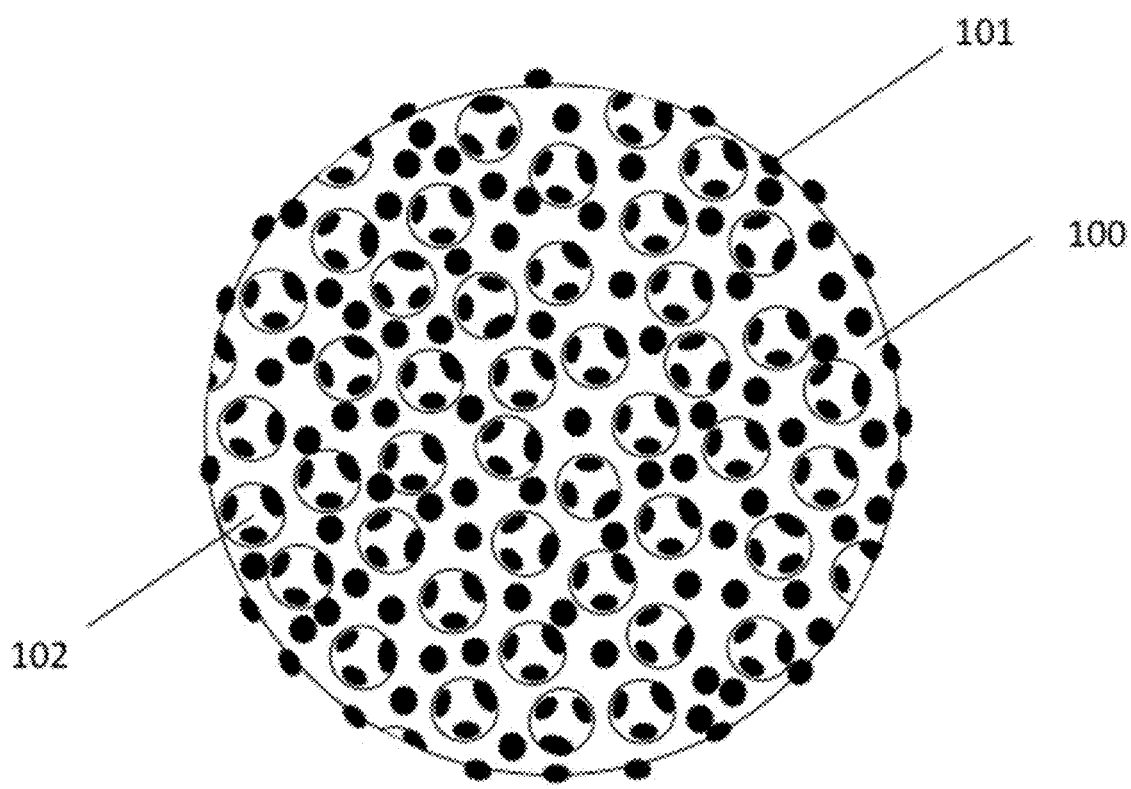
FIG. 1 shows a monolithic composite photocatalyst.
Figure 2:
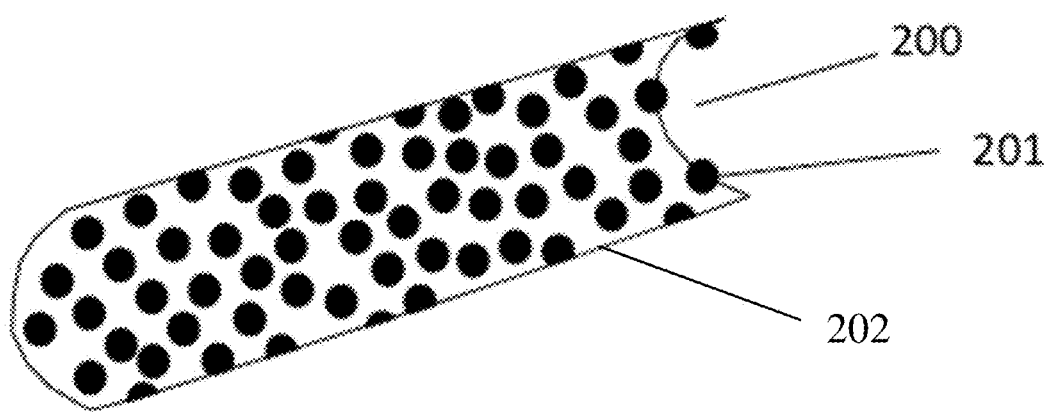
FIG. 2 is a cross section of a pore in a monolithic composite of photocatalyst.

For efficient photocatalytic conversion, the substrates should have pores for rapid air movement throughout the structure and to increase the surface area. A photocatalyst supported on a porous support is shown in FIG. 1, where the porous support 100 has photocatalyst 101 disposed on its surface and within pores 102. The pores can be of a variety of sizes, but large enough that the photocatalyst can be formed within them, as shown in a cross section in FIG. 2, where the pore 200 has nanoparticles of photocatalyst 201 disposed on the interior of the pore wall 202.

Supported titania photocatalysts are prepared using wet impregnation techniques in which known quantities of the photocatalyst precursor solutions are added to the support. The supported titania is dried and then calcined to achieve the desired crystalline phase. Repeated impregnation-drying steps can be used to increase the amount of photocatalyst on the solid support. Titania precursors useful for this impregnation synthesis include titanium ethoxide, titanium propoxide, titanium isoproxide, titanium t-butoxide, titanium nitrate, titanium oxalate, ammonium titanyl oxalate, titanium sulfate. Alkoxides, nitrates, sulfates, and oxalates of the dopant metal additive can be used. Solvents for impregnation include water, ethanol, propanol, isopropanol, dilute sulfuric acid, and dilute nitric acid.

Ethylene mitigation systems described herein may be applied in a variety of environments, including cold storage areas, controlled atmosphere storage, and high-humidity environments. The ability of the photocatalyst to maintain high activity under these different conditions is critical for its success. As synthesized, $TiO_2$ is polar, and in humid environments, water will compete for adsorption sites with ethylene. The ideal relative humidity environment for many fruits and vegetables is in the 80-95% range, with preferred storage temperatures below room temperature and as low as 0° C. In this relative humidity range, the water can outcompete adsorption of ethylene, significantly lowering the photooxidation rates of ethylene. Approaches for improving ethylene oxidation in the presence of high relative humidity levels include strategies that reduce the hydrophilicity of the photocatalyst. In the photocatalyst composites designed for the ethylene mitigation systems of this invention, components or supports that are less hydrophilic than $TiO_2$ or titania, such as, but not limited to, silicalite, can be combined with the $TiO_2$ or titania photocatalyst to provide a small number of hydrophobic sites onto which ethylene adsorption is preferred without affecting the performance of the photocatalyst. In an alternative embodiment which may be combined with the previous embodiment, adding small amounts of hydrophobic agents to the $TiO_2$ or titania and additional composite components will decrease the hydrophilicity of the composite, reducing water adsorption. Examples of hydrophobic agents include alkylsiloxanes, alkylphosphonic acids, and alkylcarboxylic acids. The alkyl chain length can be varied, and the fluorinated derivatives of these molecules can also be used.

The surface functionality of the supported titania, namely the number of hydroxyl groups on the surface, can be enhanced using wet etching techniques, including peroxide, acid, or base treatments. The number of hydroxyl groups has been shown to correlate with the photocatalytic performance of the photocatalyst.

Another aspect of the invention is the regeneration of the supported titania photocatalysts. Photocatalyst fouling can occur through a number of pathways, including the adsorption of incompletely mineralized by-products onto the titania material. Supported catalysts can be regenerated for re-use using visible light and water. Alternatively, heat treatments can be used to drive off the adsorbed species. Surfaces can be re-primed with hydroxyl groups using wet etching techniques, including peroxide, acid, or base treatments.

It will be understood to those practiced in the art of photocatalytic materials that the subject invention will also be useful and directly applicable to photo-electrochemical (PEC) cells, electro-catalytic cells, super-hydrophilic surfaces, antimicrobial surfaces, self-cleaning surfaces and other related applications of titania-based materials.

Another aspect of the invention relates to fabrication methods for liquid soluble nanocrystals of $CeO_2$—$TiO_2$ or other modified $TiO_2$ or titania ceramics, with a range of compositions as described above. The preferred NC sizes are in the range of 8-25 nm, and applicable solvents include nonpolar varieties (e.g., toluene, hexane) or polar solvents (e.g., ethanol, propanol, ethyl acetate). The preferred crystalline phase of the nanocrystals is anatase, and that crystalline phase may be maintained for low levels of solid solution components (i.e. incorporation in the lattice) such as cerium.

Figure 3:
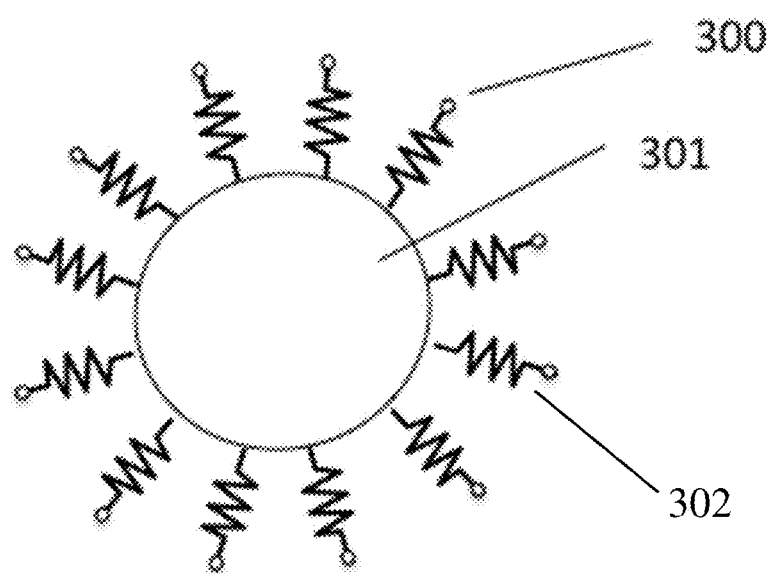
FIG. 3 shows photocatalytic nanocrystals with solubility enhancing ligands.

Whereas a number of researchers have fabricated nanocrystals of such materials, they are typically suspended in liquid media, and will eventually agglomerate and/or settle out of the suspension. One aspect of the present invention is to fabricate such nanocrystals (NCs) with organic ligands affixed during early stages of processing, thereby preventing agglomeration. Such ligand systems may be subsequently exchanged for others during processing, and will enable facile manipulation of the nanocrystals, including direct incorporation of the NC containing solution into a solid forming matrix, described below. FIG. 3 shows typical surface functionalized NC 300 with surface ligands 302 on the NC 301. The surface ligands may also be termed 'capping ligands'.

$TiO_2$ or titania nanocrystals can be prepared following a variety of wet chemical and solvothermal approaches. Depending on the reaction conditions (e.g., temperature, reaction time, solvents, ligands, etc.), a variety of shapes (spheres, rods, bipyramids, etc.), crystalline phases, sizes, and solubilities can be achieved. Soluble, non-aggregated $TiO_2$ or titania nanocrystals are attained by incorporating ligands that can coordinate to the surface of the nanocrystals during growth. These ligands prevent particles from aggregating, passivate surface defects, and allow for nanocrystal solubility in a variety of solvents. Dopant precursors such as, but not limited to, $Nb^{5+}$ and $Sn^{4+}$ can be added to the titania precursors in the initial stages of the reaction to facilitate their incorporation into the titania lattice.

A related aspect of the invention describes the synthesis of Ce-doped $TiO_2$ nanocrystals with capping ligands that render the composite nanocrystals soluble in organic solvents. Incorporating $Ce^{3+}$ and $Ce^{4+}$ into the $TiO_2$ lattice shifts bandgap to lower energies, allowing for electron promotion from the valence to the conduction band in the semiconductor using light with wavelength longer than 380 nm, more preferably 400 nm, thereby extending the wavelength of light which can be used to create photocatalytic action to a more easily generated wavelength range.

A related aspect of the invention describes fabrication methods to form the photocatalytic nanocrystal materials with optical absorption shifted to longer wavelengths (e.g., >400 nm.) in order to utilize visible light LEDs to stimulate the photocatalytic effect. This allows use of LEDs which are safe for human exposure which can also promote photocatalysis.

There is evidence that the $CeO_2$—$TiO_2$ interface plays a significant role in the improvement of photocatalytic degradation of organics. To exploit this advantage, in one aspect of this invention interfaces can be purposefully engineered into the nanocrystals through the creation of core-shell structures such as, but not limited to, $CeO_2$ cores with $TiO_2$ shells. In another aspect of this invention $TiO_2$ nanocrystals can be synthesized, and smaller $CeO_2$ nanocrystals can be deposited onto the $TiO_2$ core to create multiple $CeO_2$ interfaces which can improve the photocatalytic degradation kinetics.

A related aspect of the invention describes fabrication methods to form the subject photocatalytic nanocrystal materials with a crystallographic structure that is optimized for efficient photocatalytic activity, preferably anatase crystal structure, and to therefore enhance the photocatalytic effect.

Figure 4:
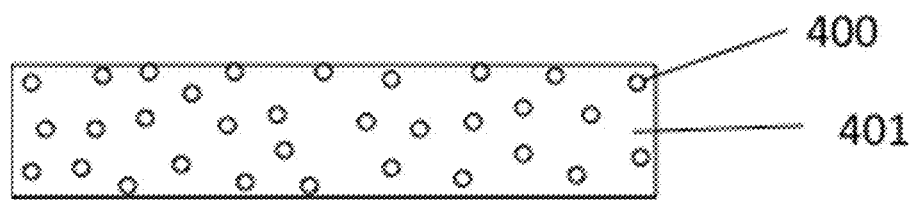
FIG. 4 shows the photocatalytic nanocrystals of FIG. 3 in a matrix.

Titania nanocrystal loading levels within the matrix material can be varied to achieve optimum performance (0.1-20 wt %). Ligand-based, soluble nanocrystals can be well-dispersed in the desired matrix, allowing charges to be effectively distributed throughout. The liquid matrix-titania composite can be deposited as films using a variety of techniques, including spin-coating, dip coating, spray coating, drop coating, roll-to-roll printing, and the like. A typical matrix-titania composite is shown in FIG. 4 where the soluble nanocrystals 400 are dispersed within the matrix 401. Once deposited, the titania surfaces can be activated with wet-etchants, including peroxide, to enhance the surface hydroxyl groups necessary for forming the reactive oxygen species critical for photocatalysis. These etchants can be applied during routine cleaning/wipe-down cycles as an approach for reinvigorating and optimizing the photocatalysis efficiency.

Figure 5:
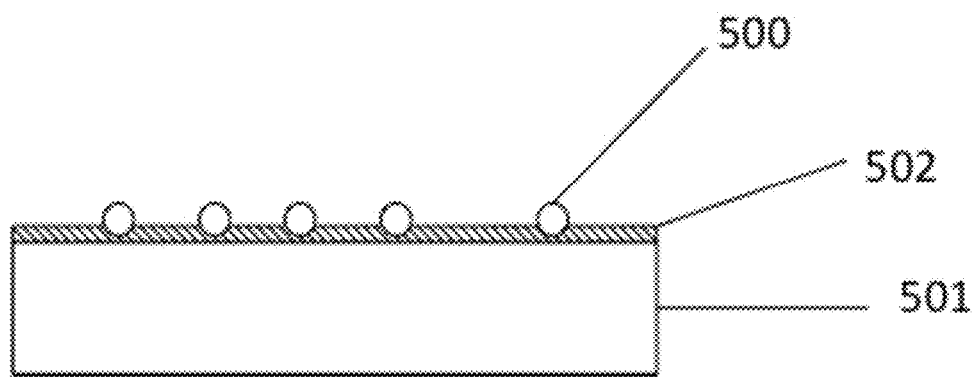
FIG. 5 shows photocatalytic particles adhered to a surface.

In addition to mesoporous and microporous supports described above, the modified titania may be formed by other methods as a powder. The powder may then be distributed onto any type of support with macroscopic dimensions (e.g. silica tubes, other types of open caged structures), or formed into various shapes such as beads, pellets, rods or tubes. Dimensions may be on the order of millimeters. An adhesive material may be used to promote bonding of the powder to the support. Examples of adhesive materials include hexamethyldisilazane or other silanazanes, or other inorganic adhesive materials, such as thermally flowable glasses based on silica or the like. Flowable glasses may contain constituents that lower their melting points such as vanadium oxide. FIG. 5 depicts photocatalytic particles 500 adhered to a substrate or surface 501 with a flowable glass 502 or other adhesive material. The photocatalytic particles may be incorporated on optically non-absorbing porous supports such as alumina or silica (as defined above), "monolithic composite photocatalysts" or formed as a powder or formed from such monolithic composite photocatalyst that have been ground or milled by mechanical means such as ball or roller milling.

Figure 6:
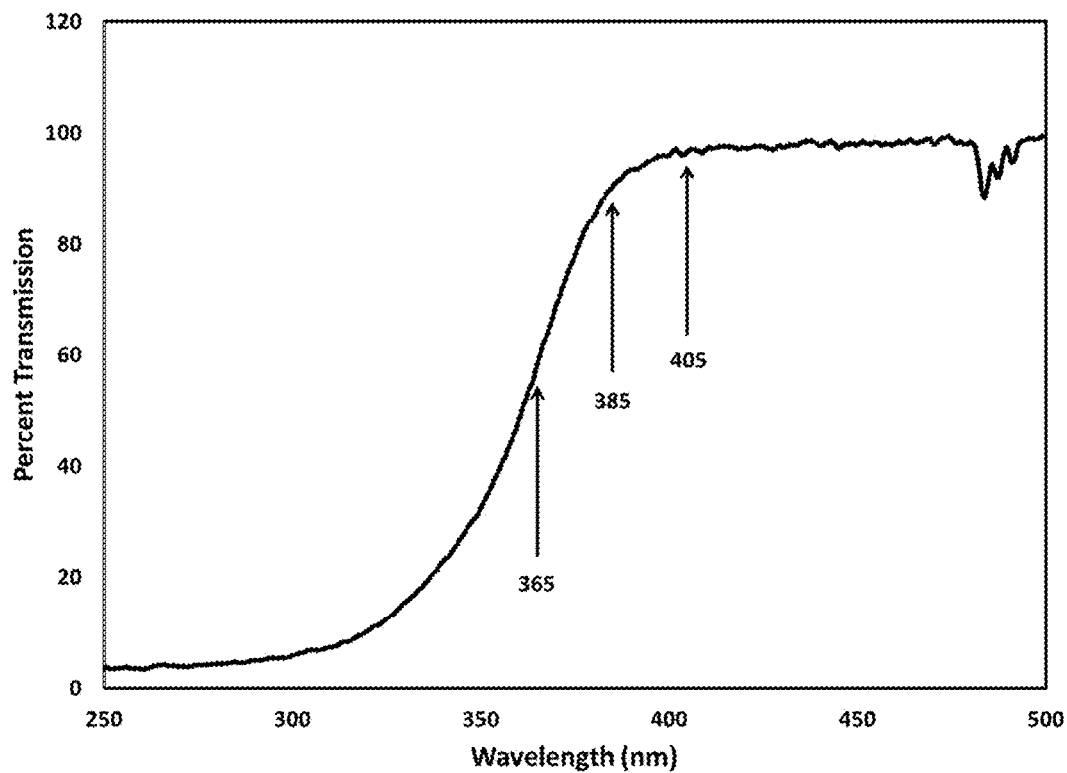
FIG. 6 shows optical transmittance for of a monolithic composite photocatalyst with 8 mm nominal thickness.

FIG. 6 shows the spectral transmittance of a representative monolithic composite photocatalyst. Transmission measurements of the monolithic composite photocatalytic material were performed by loosely packing the material into a 4 mm deep reservoir backed by a high reflective mirror, and with polished reservoir sidewalls. The material is illuminated using a Xe lamp though a bifurcated fiber optic probe placed in an aluminum shell which holds the optic 3 mm above the material. The incident light therefore passes through 8 mm of the sample in this 2-pass configuration. Light is collected through the same probe and analyzed with a spectrometer and compared to a blank sample. The transmission curve is normalized by setting a flat region between 500 and 1500 nm to 100% transmission. Arrows on this figure call out specific wavelengths.

Figure 7:
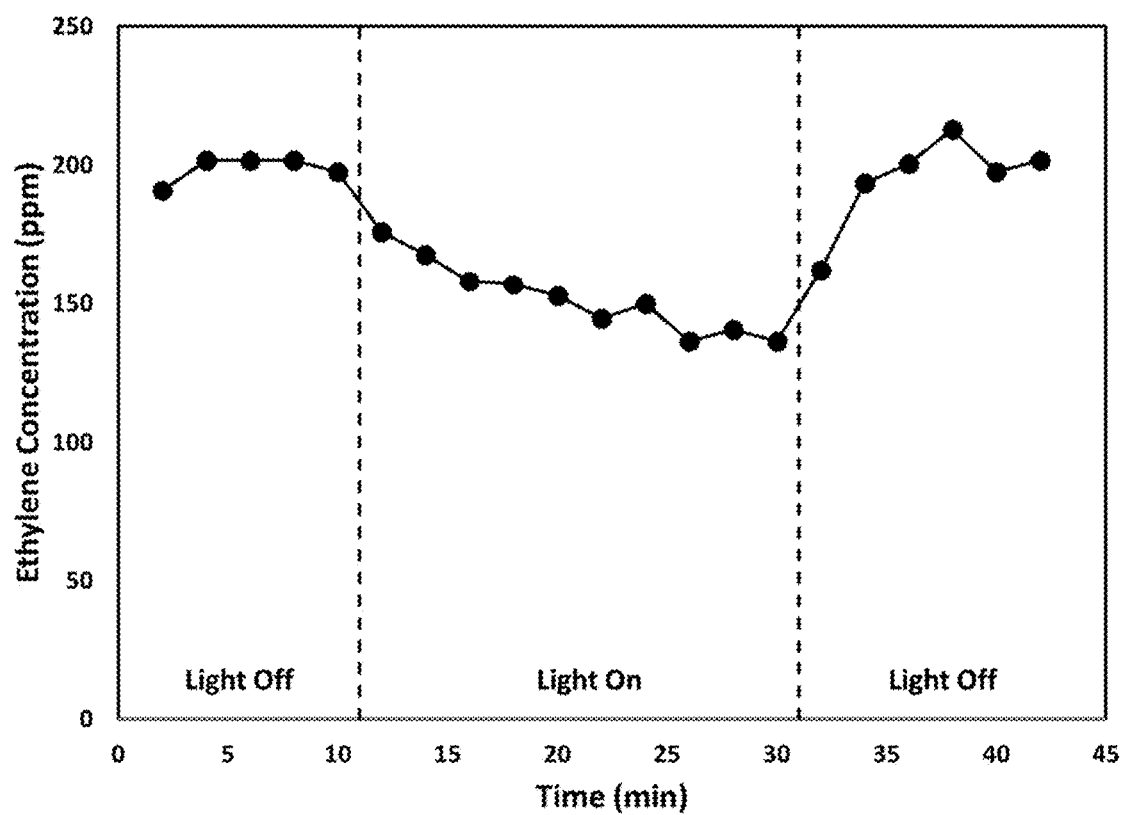
FIG. 7 shows response of a monolithic composite photocatalyst to ethylene with and without 365 nm illumination.

Ethylene decomposition was characterized using a monolithic composite of photocatalyst at a variety of wavelengths. FIG. 7 shows ethylene photodegradation measured by comparing the ethylene FTIR peak height in the dark (absence of illumination) and when exposed to 365 nm LED illumination. 200 ppm ethylene was flowed at 43 sccm through a glass tube reactor with 0.51 g of the monolithic composite photocatalytic material. The photocatalytic material comprises primarily anatase $TiO_2$ nanoparticles on an alumina support, with 12-14% titania loading, with surface area of 100 $m^2/g$.

Figure 8:
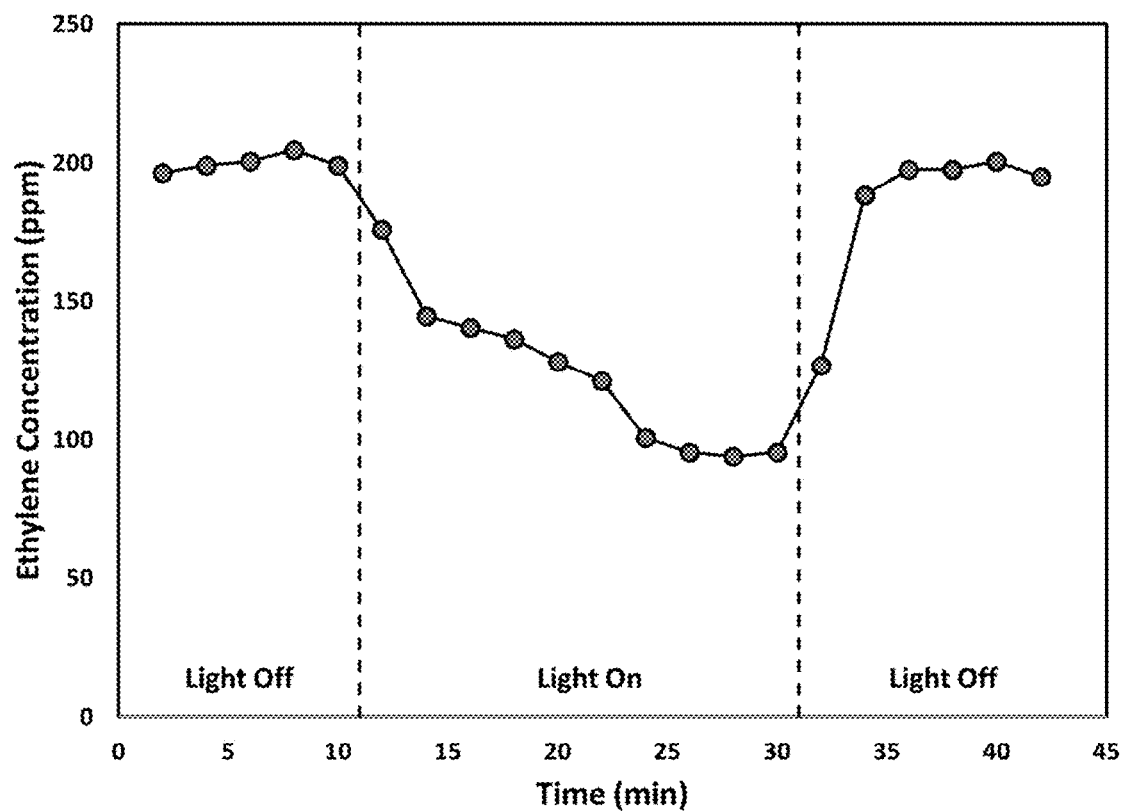
FIG. 8 shows response of a monolithic composite photocatalyst to ethylene with and without 380 nm illumination.

FIG. 8 shows ethylene photodegradation measured by comparing the ethylene FTIR peak height in the dark and when exposed to 385 nm LED illumination. 200 ppm ethylene was flowed at 43 sccm through a glass tube reactor with 0.51 g of the monolithic composite photocatalytic material. The photocatalytic material comprises primarily anatase $TiO_2$ nanoparticles on an alumina support, with 12-14% titania loading, with surface area of 100 $m^2/g$.

Figure 9:
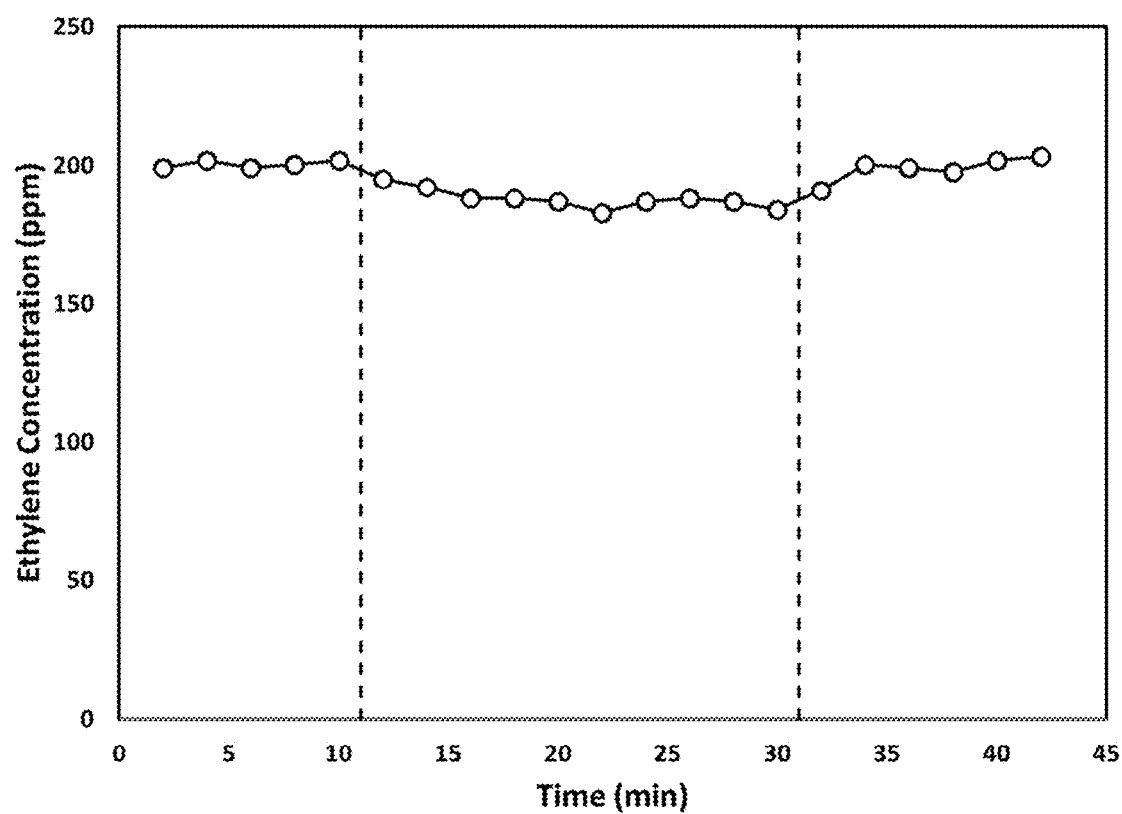
FIG. 9 shows response of a monolithic composite photocatalyst to ethylene with and without 405 nm illumination.

FIG. 9 shows ethylene photodegradation measured by comparing the ethylene FTIR peak height in the dark and when exposed to 405 nm LED illumination. 200 ppm ethylene was flowed at 43 sccm through a glass tube reactor with 0.51 g of the monolithic composite photocatalytic material. The photocatalytic material comprises primarily anatase $TiO_2$ nanoparticles on an alumina support, with 12-14% titania loading, with surface area of 100 $m^2/g$.

Figure 10:
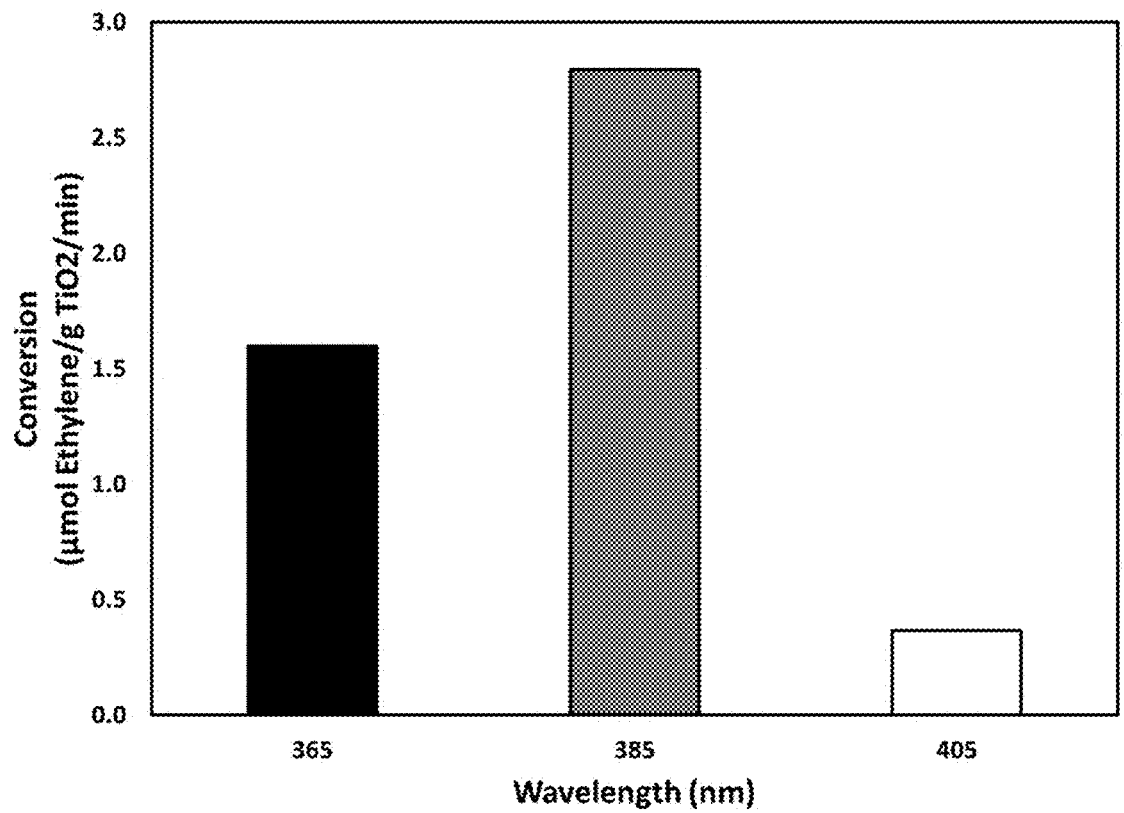
FIG. 10 shows ethylene conversion by a monolithic composite photocatalyst as a function of illumination light wavelength.

FIG. 10 shows conversion rates of ethylene by the monolithic composite photocatalytic material from a 200 ppm gas stream measured by FTIR using different LED wavelengths. The photocatalytic material comprises primarily anatase $TiO_2$ nanoparticles on an alumina support, with 12-14% titania loading, with surface area of 100 $m^2/g$.

One aspect of the invention relates to fluid purifier systems that incorporate the inventions cited above. These air purifier systems may be provided as standalone systems, or as systems that are integral to a room or isolated space that requires ambient conditions, walls and other confining surfaces to have a high degree of purity with respect to contaminating chemicals or contagion.

For purposes of this invention, fluid may refer to any mixtures of liquids, colloids and solids, capable of flowing via gravity or being pumped. In an exemplary embodiment, said liquid is the air atmosphere of horticultural or agricultural transport or storage modules, which virtually always contains trace amounts of the plant hormone ethylene. In general there are several types of modules that will be generally defined as "plant logistics modules". These will include stationary closed or semi closed containers for growth of plans including fruits, vegetables, herbs, spices and flowers, closed or semi-closed containers for storage or display, and closed or semi-closed containers for transport.

Related aspects of the invention include purification of other flowable media besides air, such as, but not limited to, water, other aqueous liquids, and non-aqueous liquids.

A further aspect of the invention relates to photocatalytic air purifier systems that incorporate combined purifier and horticultural lighting functions. These combined lighting and photocatalytic purification systems may incorporate either back surface or front surface illumination of the titania based photocatalytic material. Such combined function systems may either be for specialized use, such as, but not limited to, in operating room or other clean room environments, or for general lighting, for example in private residences, schools and workplaces. It is preferable to use visible light photocatalytic illumination in such cases to reduce possible exposure to humans, and because the cost of visible light illumination is significantly lower than for UV sources. This invention also allows more effective use of LED light sources with multiple spectral output, here referring to LED based light sources that incorporate emitters of different wavelengths, allowing an adjustable spectral output, such as may be used to enhance a plants growth during different parts of its growth cycle. Multiple spectral output may be achieved as from a combination of phosphors stimulated by one or more single wavelength emitting LEDs, and arrays of LEDs emitting with different wavelengths. The application of such multiple spectral output illumination sources to enhance plant growth and for photocatalytic illumination is a valuable feature of the subject invention.

The invention includes monolithic integration of the subject photocatalytic materials on the surface of a solid state light emitting device such as an LED or OLED. In this context the LED devices may be individually packaged die, multiple die modules, LED lamps (e.g. conventional light bulbs, MR-16s, etc.), lighting fixtures and luminaires. For LED packages and modules, the photocatalytic material would be back surface illuminated in these integrated devices. For LED lamps, fixtures and luminaires, the photocatalytic material may be either front or back surface illuminated, depending on technical and aesthetic aspects of the device design.

Figure 11:
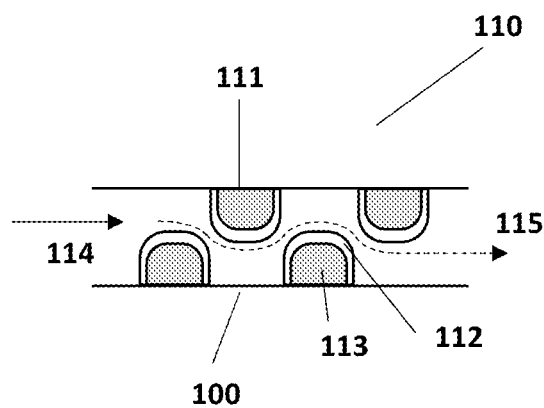
FIG. 11 shows a fluid purifying flow cell integrated with interiorly disposed LEDs and photocatalytic material monolithically integrated on the LEDs.

FIG. 11 shows a compact fluid purification flow cell 110 that incorporates LED illumination sources 111 interiorly disposed in the flow region of cell 110, with photocatalytic material 112 integrated on the surface of the LED packaged die 113. This material may utilize the monolithic composite photocatalyst in the subject invention, or other well known photocatalysts such as P25 of MC500. The fluid to be purified is introduced to the cell at one end 114, and flows past the LED/photocatalyst structures 111 and out of the cell at the other end 115.

Compact purification cells of this type may be especially useful in microfluidic systems or for use in preprocessing inlet gas for gas sensing. In one embodiment, this cell may be used to set a zero point in an ethylene sensing system, or for improving signal to noise in such sensors using a homodyne technique, which modulates the concentration of an inlet gas. This would be achieved by modulating the LED photocatalytic illumination at a frequency $f_m$, and the sensor output signals at that frequency $f_m$ would be amplified, resulting in improved sensitivity.

Figure 12:
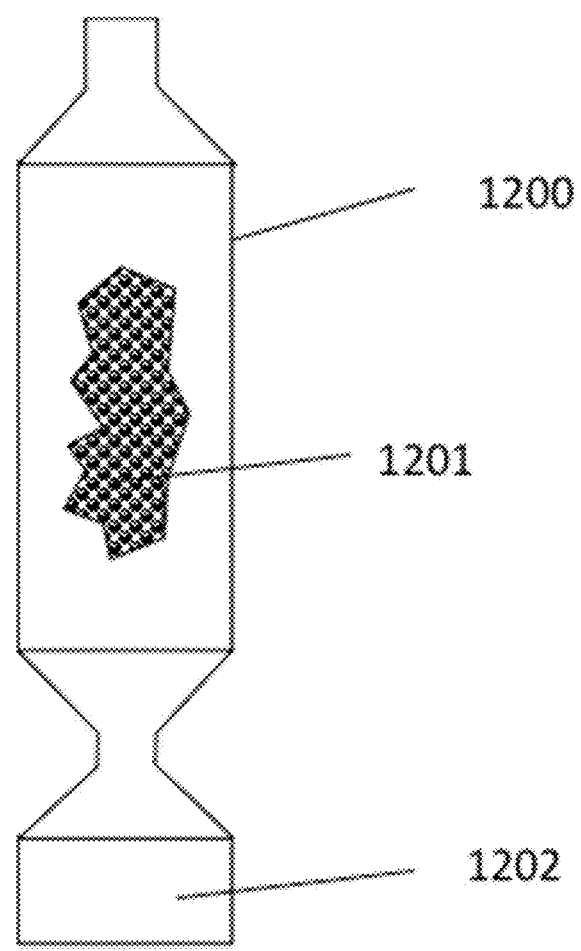
FIG. 12 shows an ethylene scrubber in a bed configuration.
Figure 13:
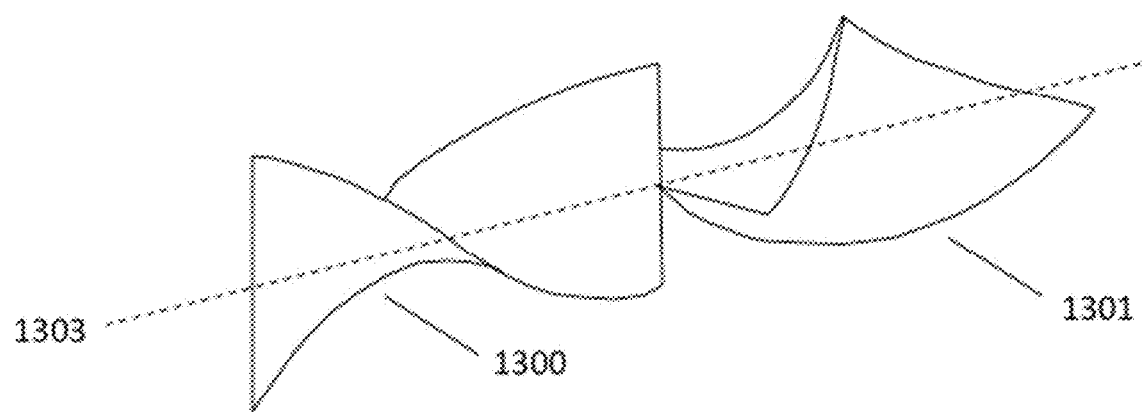
FIG. 13 shows an element that may have photocatalysts disposed on it to produce a low pressure drop ethylene scrubber.

The monolithic composite photocatalyst may be used in a fixed or fluidized bed to allow the fluid atmosphere of the ambient environment to efficiently contact the photocatalytic surfaces. FIG. 12 show a cylinder 1200 that contains a bed 1201 of the monolithic composite of photocatalyst. A fan 1202 is used to force the target fluid through the bed. Depending on the fluid velocity, the bed may be static or fluidized. The monolithic composite of photocatalyst or finer particles made therefrom may also be adhered surfaces disposed with a flow system in place of the bed. The surfaces may have a variety of shapes to cause gas mixing as shown in FIG. 13, which shows two elements 1301 and 1302 which are disposed along an axis 1303. Different shapes may be used, including baffles, partial baffles and a plurality of such shapes or elements within the flow path. These shapes are designed to minimize pressure drop for a given mixing under laminar or preferably turbulent flow regimes. The present invention may include a number of the inventive elements summarized above, in a variety of combinations and configurations.

EXAMPLES

The Inventions summarized above are described and illustrated in several example embodiments.

In one embodiment, the subject high surface area photocatalytic materials are integrated with visible photocatalytic illumination from light emitting diodes (LEDs) and a means of fluid exchange such as an electrically driven fan. Photocatalytic illumination would be incident on the subject photocatalytic materials in a manner that allows either passive or active air flow across, over or throughout the high surface area media. Incident photocatalytic illumination and the phototcatalytic material would be configured together to achieve adequate illumination through out the active material, e.g. greater than 10% of the incident illumination at any volume element in the material.

This system would be utilized in a closed or confined system horticulture, floriculture or agriculture growth module, a "plant logistics module", in order to reduce the concentration of plant generated hormones in that environment. Ethylene and other hydrocarbons in confined growth volumes are known to increase ripening and spoilage rates.

In this embodiment a photocatalytic air purifying subsystem is integrated into the grow lights that are used to provide light for growth, substituting or augmenting natural sunlight.

Figure 14:
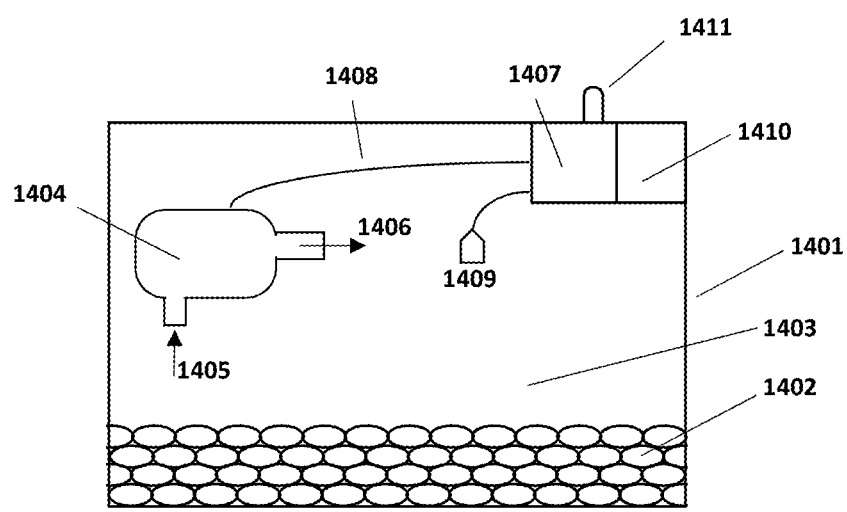
FIG. 14 is plant logistics module incorporating ethylene scrubber, control system, sensor, and communications.

FIG. 14 shows a plant logistics module 1401, that contains plant produce 1402 for transport or storage. The atmosphere 1403 in this closed or partially closed container may develop increase ethylene concentrations. An interiorly integrated photocatalytic ethylene scrubber 1404 is controlled by a control system 1407, which powers and modulates operation of the scrubber via communication to the scrubber 1408. The control system and scrubber are powered by a power supply 1410 that incorporates batteries, solar cells, or fuel cells. Such communication 1408 may be hardwired or wireless. Atmosphere 1403 is drawn into the scrubber 1405 by conventional blowers, and the purified gas 1406 is reintroduced to the atmosphere. The control system has an ethylene sensor input 1409 and that signal is processed and used to determine the scrubber operation. The control system communicates with external systems and networks via an antenna 1411, using GSM or other wireless protocols.

The technology may be implemented in horticulture, floriculture or agriculture storage or transport modules, and in modules that combine controlled growth, ripening during transport to a distribution center or directly to customers. These combined growth, storage and transport modules may also be directly incorporated in retail or wholesale displays upon arrival, by incorporation of a plastic or glass wall for the enclosure. The module may also comprise a cold storage room, cabinet or sub-partition of a cold storage room.

It is known that ethylene generation in some plants is due to environmental stresses. A preferred embodiment would be incorporation of a gas sensor to detect and quantify ethylene or other plant hormones, and the output of that gas sensor, in the form of a voltage, current, resistance, etc. could be used by a control system to modify operation of the photocatalytic air purification subsystem, in order to save energy used for photocatalytic illumination, thereby maintaining or controlling gas phase hormone concentrations at a fixed level, modulating those levels, while reducing the need for cooling and other environmental controls. The gas sensor would preferably be a compact infrared absorption sensor that is set up for absorption bands of the various hormone gas species. Other sensors such as chemical sensors, electrochemical sensors, photoacoustic sensors, chemoresistive sensors, plasmon enhanced peptide surface sensors, and mass spectrometers may also be employed to provide feedback and control of the gas levels via photocatalytic illumination control.

In addition to the hormone gas concentration levels, other control system inputs could include optical or physical plant measurements during growth (i.e. to characterize plant stress and other characteristics in real time). These complimentary parameters may include optical fluorescence base parameters for the subject plants and flowers, as well as abiotic factors including ambient temperature, relative humidity, barometric pressure and altitude, contactless leaf temperature, leaf angle and leaf direction. Other complimentary parameters include incident sunlight that is entering the plant environment, and external parameters, including physical location, estimated time before arrival at destination, specific plant growth environment databases, etc.

Another embodiment would incorporate photocatalytic illumination LEDs for ethylene scrubbing into light engines that also incorporate horticulture, floriculture or agricultural light sources, i.e. "horticultural grow light systems". Such systems substitute man made light for the natural solar spectrum, and a wide variety of light sources are used, including fluorescent, incandescent high intensity discharge (HID) and LED. LED horticultural light systems are particularly attractive due to their low cost, compact characteristics, low thermal output (due to high efficiency) and the possibility of sophisticated spectral control. Optionally these systems may include general illumination light sources as well. Such combined functionality light engines would share some or all lighting subsystems, including mechanical mounting on boards, thermal control interfaces, power supplies, modulation either via continuous current control or pulse width modulation methods, primary optics (optical control on board). Secondary optics, i.e. optical control remote from board, may or may not be shared with grow light and general lighting schemes. The use of grow lights in combination with photocatalytic ethylene mitigation would allow highly desirable flexibility to retard or accelerate growth and ripening of the module contents.

A further embodiment is integration of the subject technology in a transport or storage container for agricultural produce or floriculture products. For example the module may be a 20' or 40' container for transoceanic shipping, or a shipping container for air freight. Smaller pallet size modules (e.g. 4'×4'×4' or 2'×2'×4', etc.) may also be used, depending on the needs of the horticultural or floricultural product. External wireless communications may be sent to the container to control the photocatalytic ethylene mitigation system. These signals may use common wireless communication protocols, either free space optical or radio wave based. Long range communications may utilize Low-power wide-area networks (LPWAN), or cellular standards such as GSM CDMA, GPRS, 4G and 5G More localized communications may utilize Wi-Fi, wireless senor networks and Bluetooth. Based in part or completely on these external signals, the ethylene mitigating system may be operated at certain times and under certain conditions, based on module location or other external signals to facilitate minimization of cooling or other module environmental parameters. Output signals transmitted from the module may include, for example, ethylene concentration levels, total ethylene mitigated by the system, plant stress data collected via luminescence measurements, humidity, etc.

Figure 15:
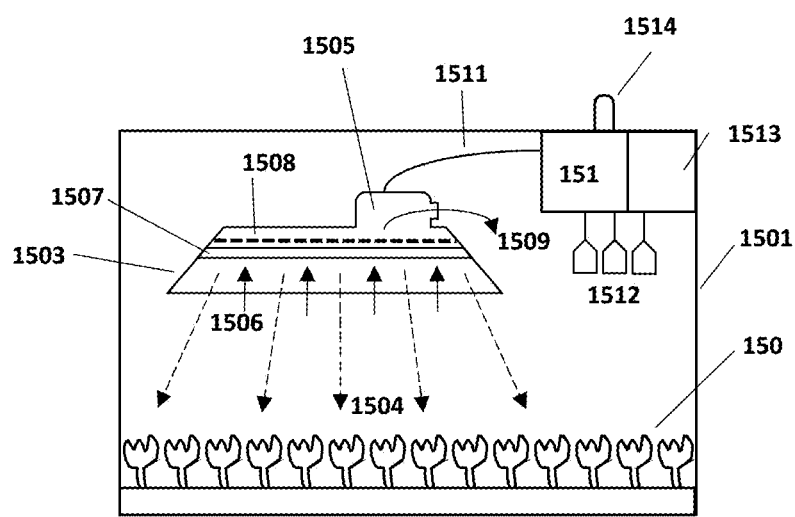
FIG. 15 is plant logistics module incorporating combined lighting and photocatalytic ethylene scrubber, control system, multiple sensors, and external communications.

FIG. 15 shows a plant logistics module 1501, that contains growing plants 1502 either in an indoor growth facility, or for transport or storage. The atmosphere in this closed or partially closed container may develop increase ethylene concentrations. An interiorly integrated combined horticultural grow light/photocatalytic ethylene scrubber 1503 is controlled by a control system 1510, which powers and modulates operation of the scrubber via communication to the scrubber 1511. Such communication 1511 may be hardwired or wireless. The combined grow light/ethylene scrubber 1503 utilizes a single LED horticultural light source and photocatalytic illumination source 1507. Horticultural grow light illumination, typically comprised of blue and red spectral components, and also sometimes incorporating near UV (UVA) and green light, is directed downward to the plants 1504. Photocatalytic illumination wavelengths in the UVA, violet and blue (typically 360-460 nm) are directed upward from 1507 to a photocatalyst membrane or porous surface 1508 that preferably incorporates the subject monolithic composite photocatalysts, or another photocatalyst. Atmosphere in the plant logistics module is drawn into the lighting/scrubber 1506 via blowers in 1505, through the photocatalytic membrane 1508 and purified gas is reintroduced to the atmosphere 1509. The control system and scrubber are powered by a power supply 1513 that incorporates batteries, solar cells, or fuel cells. The control system communicates with external systems and networks via an antennas 1514, using wireless protocols such as GSM and GPS. The control system uses such external location and logistics data, combined with input data from multiple sensors in the plant logistics module, for sensing ethylene concentration, humidity and temperature 1512 to determine the scrubber operation. In some cases all the plant logistics sensor and location data may be uploaded and centrally processed, and plant logistics module operating parameters data my then be downloaded.

The subject invention may be embodied in the forgoing examples that are by no means restrictive, but intended to illustrate the invention. Different embodiments and examples given previously may be freely combined.

What is claimed is:

1. A plant logistics module, comprising an integrated photocatalytic ethylene mitigation system, wherein light emitting diodes (LEDs) provide the photocatalytic illumination to drive the photocatalytic ethylene mitigation system, further comprising a porous monolithic composite photocatalyst comprising titanium oxide, wherein the monolithic composite photocatalyst is modified to achieve optical absorbance greater than 10% at a wavelength of approximately 405 nm for a monolithic composite photocatalyst material thickness of 8 mm.

2. The module of claim 1, wherein the titanium oxide is primarily anatase phase.

3. The module of claim 1, wherein the titanium oxide is formed in islands in the porous monolithic composite photocatalyst.

* * * * *